(12) United States Patent
Marwinski et al.

(10) Patent No.: US 7,469,319 B2
(45) Date of Patent: Dec. 23, 2008

(54) METHODS AND APPARATUSES FOR MAPPABLE SHARED CACHE MANAGEMENT

(75) Inventors: Dirk S. Marwinski, Heidelberg (DE); Petio G. Petev, Solia (BG); Ingo Zenz, Epfenbach (DE)

(73) Assignee: SAP AG, Walldorf (DE)

( * ) Notice: Subject to any disclaimer, the term of this patent is extended or adjusted under 35 U.S.C. 154(b) by 229 days.

(21) Appl. No.: 11/495,372

(22) Filed: Jul. 28, 2006

(65) Prior Publication Data

US 2008/0028153 A1    Jan. 31, 2008

(51) Int. Cl.
*G06F 12/00* (2006.01)
(52) U.S. Cl. ...................................... 711/130
(58) Field of Classification Search ................. 711/120
See application file for complete search history.

(56) References Cited

U.S. PATENT DOCUMENTS 7,281,012 B2 * 10/2007 Galchev ..................... 707/100
2005/0262181 A1 * 11/2005 Schmidt et al. ............. 709/200
2005/0262493 A1 * 11/2005 Schmidt et al. ............. 717/164
2005/0262512 A1 * 11/2005 Schmidt et al. ............. 719/310
2006/0059453 A1 * 3/2006 Kuck et al. ................. 717/100
2006/0064545 A1 * 3/2006 Wintergerst ................ 711/130
2006/0070051 A1 * 3/2006 Kuck et al. ................. 717/162
2006/0277366 A1 12/2006 Rajamony et al.

* cited by examiner

*Primary Examiner*—Brian R Peugh
(74) *Attorney, Agent, or Firm*—Blakely Sokoloff Taylor & Zafman

(57) ABSTRACT

Methods and apparatuses enable separate management of shared data structures and shared data objects referenced by the shared data structures. The shared data structures are stored in a first memory, and the shared data structures are separately managed from the referenced shared data objects. The shared data objects can be accessed by the shared data structures via direct and/or indirect reference. A separation agent can detect references to data objects in an application to indicate which data objects are shared and are to be stored in the separate cache.

12 Claims, 4 Drawing Sheets

METHODS AND APPARATUSES FOR MAPPABLE SHARED CACHE MANAGEMENT

FIELD

Embodiments of the invention relate to shared memory management, and more particularly to management of a shared cache having mappable objects.

BACKGROUND

Many business or enterprise systems make use of applications that reference data objects, or units of data with rules regarding access/manipulation of the data. Data objects, or simply objects, as referred to herein should be understood to include any type of data object, including business objects, which are objects referenced by a business application or software executing a business process. In many implementations, one or more objects are shared by multiple applications.

An application may be part of a virtual machine (VM) that includes one or more applications. The applications of a VM can access functionality across multiple platforms and systems accessible from the VM. The applications typically have a local memory, which may be accessible through the VM. In addition to a local memory, the applications have access to a shared memory. The shared memory may serve to store or cache commonly used objects or objects shared among multiple applications.

Particular implementations of enterprise systems include the use of a mappable shared closure, which provides a data structure in shared memory to store one or more objects, including a tree of related objects. A shared closure includes an object and all objects transitively reachable from the object. Shared closures exist in shared memory, and can be copied locally to the local memories for operation on one or more objects or object relationships (references). Traditional management of the shared memory encounters problems when dealing with shared closures. In short, the creation, copying, and/or modifying of a shared closure may introduce errors into a system that may not be detectable for months or longer. Traditional management of shared closures failed to fully appreciate the behavior of the shared closures in using and/or referencing objects. Problems associated with known methods of object management are discussed in more detail below with reference to FIG. 1.

FIG. 1 is a block diagram of a prior art embodiment of a mappable shared memory having shared closures. Local memories 110 and 120 represent memory local to one or more applications or a VM having the application. Local memories 110 and 120 may be the same or separate memories. Mappable shared memory 130 includes multiple shared closures. In practice, shared closures may be restricted to being mappable (can be referenced), or read-only. Referencing mappable shared closures generates the circumstances described below. Three problems to be discussed are: eviction, referencing outdated objects, and modifying read-only objects.

Regarding object eviction, management of mappable shared memory 130 can be performed by a cache management library (CML) or other management entity. A CML may have rules to evict entries from mappable shared memory 130 when the size reaches a threshold. To apply eviction, the CML will execute an eviction policy (e.g., a least recently used (LRU) policy to evict entries that have not been accessed for the longest time). Thus, if closure A is the least recently used entry, it may get evicted, without any problems presented. However, consider a circumstance such as that shown with regards to closures B and C. Closure C is created by having objects organized in a logical structure. One of the objects has a reference to shared object BC of mappable shared memory 130. Thus, objects are operated on locally within local memory 110, but with reference to a shared object stored in mappable shared memory 130. Closure C is then created in mappable shared memory 130 as the logical structure is saved, and the local object at the top of the tree is saved into mappable shared memory 130, along with all transitively reached objects of the object. As used herein, description will be made to referencing objects, referencing closures, or referencing from a closure. Terminology related to referencing a closure or referencing from a closure is understood to refer to a reference from an object of one shared closure to an object of another shared closure.

References between shared closures may render eviction useless. Consider that closure B is the entry that is determined to be evicted based on the eviction policy. The CML will attempt to evict closure B, and then apply memory management as if the memory occupied by closure B has been freed. However, a garbage collector routine may be unable to free the memory occupied by closure B because it is still referenced from closure C. The fact that the garbage collector cannot free the memory results in a discrepancy between the memory management and the real usage of memory 130. The real usage of memory 130 may in fact be higher than what the memory management indicates, which may lead to out-of-memory problems.

Regarding referencing outdated objects, an application may copy closure D to perform a modification of object DE of the closure. The copy operation results in a copy of the objects of closure D residing in local memory 120, where modification of object DE results in the object of closure D referencing object D' in place of object DE (D' merely being the modification of object DE). The application may then create closure D' in mappable shared memory 130 by storing the objects (i.e., the entire data structure) from local memory 120 into shared memory 130. Thus, a new version of closure D, closure D', exists in mappable shared memory 130. However, note that closure E references object DE of closure D. The copying and modification of object DE in local memory 110 traditionally does not modify references to the modified object even if the object itself is validly modified. Attempting to update and maintain consistency in object references for all objects copied and modified would be very difficult at best, and may be practicably unreasonable.

The update of closure D to closure D' may lead to two separate problems. The first is that the reference from closure E to object DE of closure D would be a reference to an outdated object. Unless the same application that references object DE from closure E were the application modifying object DE, there may be no way of detecting the fact that closure E references an outdated object. Additionally, the modification and copying of closure D' into mappable shared memory 130 would be expected to replace closure D. Thus, closure D is shown crossed out, which is the condition that would be assumed by the memory management. However, the reference to the outdated object may prevent a garbage collector from actually removing closure D, resulting in the system having a higher memory usage than expected by the memory management.

Regarding modifying read-only objects, when implementing a shared closure, it is not necessarily easily visible from an object reference whether the referenced object is stored in a heap of a local memory, or whether it is stored in a shared closure in shared memory. For example, closure C includes a reference to object BC of closure B. If an application copies the objects of closure C into local memory 110, the application may not be able to easily discern whether the reference to object BC is a reference to an object in mappable shared memory 130 (which is in fact the case in this example), or whether the reference is to an object BC contained locally (depicted by the dashed lines within the data structure shown in local memory 110). When the application attempts to modify object BC (because it assumes BC is local and modifiable) to result in closure C' as a modified version of closure C, the attempted modification will fail. Object BC is stored in mappable shared memory 130, and is read-only. Thus, closure C' with modified object C' will fail.

The above problems illustrate the potential hazards of references to items stored in a mappable shared memory. However, for many applications, it may be essential to link cache items due to the complexity of application domains and resulting object graphs. Current memory management mechanisms are insufficient for dealing with the hazards involved with referencing objects stored in mappable shared memory.

SUMMARY

Methods and apparatuses enable separate management of shared data structures and shared data objects referenced by the shared data structures. The shared data structures are stored in a first memory, and the shared data structures are separately managed from the referenced shared data objects. The shared data objects can be accessed by the shared data structures via direct and/or indirect reference. The shared data objects can be separated and stored in a memory managed separately from the first memory. A separation agent can detect references between objects stored in different shared closures in a shared cache and indicate whether they should be managed separately.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
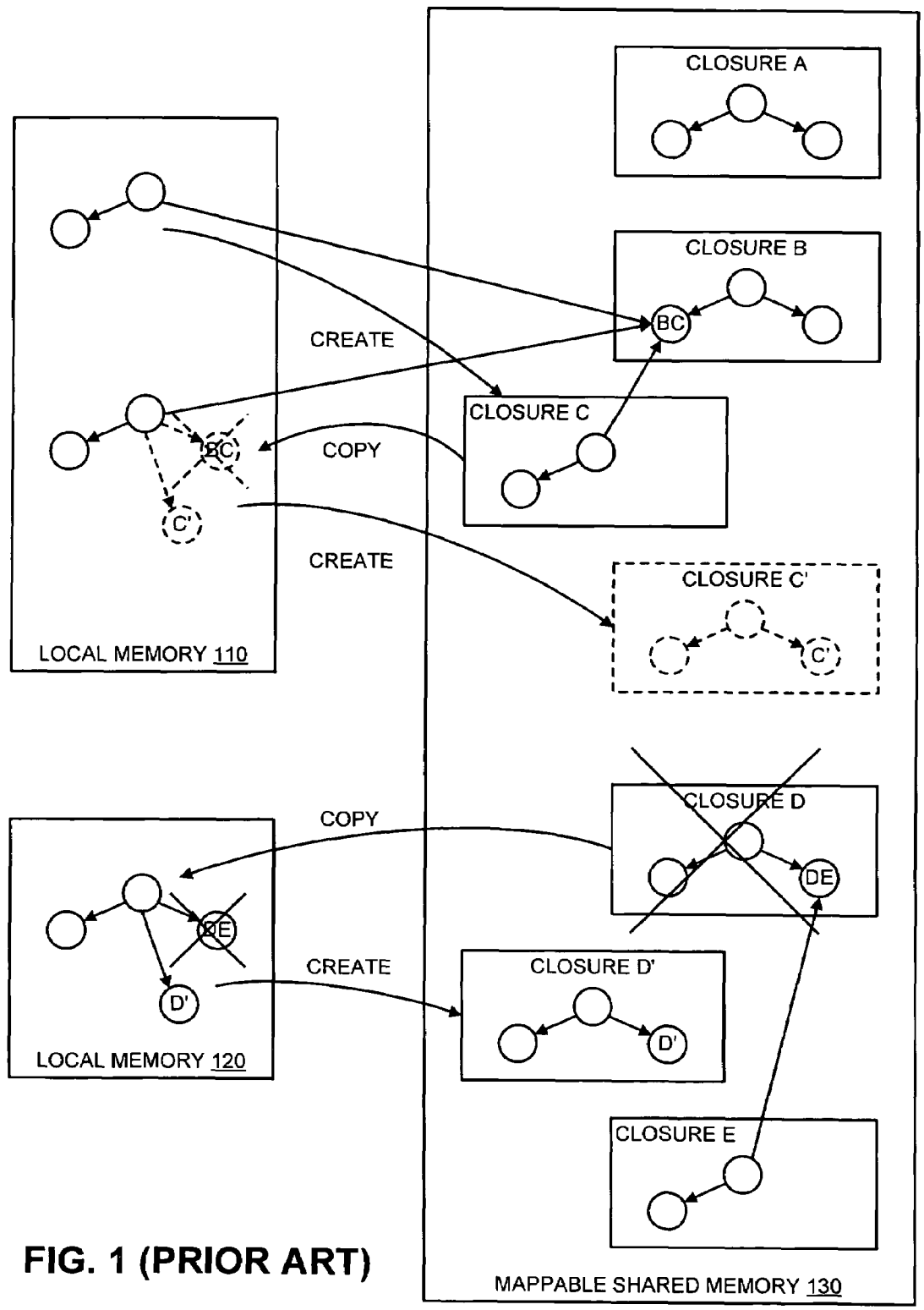
FIG. 1 is a block diagram of a prior art embodiment of a mappable shared memory having shared closures.

As used herein, references to one or more "embodiments" are to be understood as describing a particular feature, structure, or characteristic included in at least one implementation of the invention. Thus, phrases such as "in one embodiment" appearing herein may describe various embodiments and implementations of the invention, and do not necessarily all refer to the same embodiment. However, they are also not necessarily mutually exclusive. Descriptions of an overview of embodiments of the invention is provided below, followed by a more detailed description of certain details and implementation made with reference to the drawings.

In a system that stores objects in a memory shared among multiple applications, the shared memory can be separated into multiple shared memories. While the physical memory structure may remain unchanged, the management of the physical memory can be performed in a manner to separately manage portions of the memory as individual shared memories. In one embodiment, shared closures are stored in one shared memory, and objects referenced by other items are stored in a separate shared memory. Thus, the shared memory can be managed to prevent a shared closure from referencing an object in another shared closure that resides in the same logical memory. Rather, both shared closures would reference the object in a shared memory that is separately managed from the memory in which the shared closures are stored. As previously stated, various descriptions include phrases related to shared closures referencing objects or other shared closures. Such reference is understood as a shorthand, indicating that one or more objects of the shared closure references one or more objects that exist outside the shared closure.

The object that is referenced by multiple shared closures can be stored as a separate shared closure managed independently of the shared memory in which the referencing shared closures are stored. In one implementation, the referencing is performed with direct references to the objects in the separate shared memory. For purposes of the below discussion, up to the description of the figures, the shared memory in which the referencing shared closures are stored will be referred to as the "first shared cache," and the shared memory in which the referenced object or shared closure is stored will be referred to as the "second shared cache." Note that these are merely arbitrary labels, and could be reversed, or otherwise labeled. An agent can evaluate references between objects stored in different shared closures to determine what references should result in storing an object in a separate shared cache to reduce the problematic behavior associated with referencing shared objects. By ensuring with the agent that there are no references between stored items within a shared cache, the memory manager of each shared cache will have a consistent view of the usage of the memory. Also, because the objects referenced are stored in a separate cache, it is more apparent when an object is read-only rather than modifiable.

The decisions of how to structure the lay out of caches, the eviction/management policy of each cache, and where to place objects is generally a design-time decision made by a developer. In one embodiment, the decision is part of a debugging procedure. The decisions may be based on factors such as object usage, number of total objects, size of objects, number of cache read accesses, cache modification, etc. An agent provides information to the developer to cause or influence the decisions.

In one embodiment, implementing a system that separates the shared memory into independent shared caches with direct object references generally does not allow for object eviction from the second shared cache. Direct object references can be made, for example, with memory location references. Thus, for practical reasons, such an implementation is generally limited to use where a relatively small number of read-only objects are stored in the second shared cache. Additionally, such an implementation may include a restriction on the second shared cache to only store read-only objects, which cannot be modified. Preventing eviction allows for the memory management to have a consistent view on memory usage, and preventing object modification reduces the risk of referencing outdated objects.

In another implementation, rather than separating the shared memory into independent caches with direct object references, a second shared cache is implemented that supports indirect or symbolic object references. Thus, to obtain an object in the second shared cache, an application uses a key or symbol for the object to retrieve it from the second shared cache. Such an implementation allows the use of eviction in both the first and second shared caches, rather than just in the first shared cache (i.e., referenced objects could be evicted). Additionally, referenced objects in the second shared cache can be updated, and a large number of objects can be supported.

In one embodiment, an indirect reference implementation can be performed within a single cache by simply using keys for referenced objects. Thus, the shared memory may not necessarily be separated to obtain the benefits. The difference in memory management is that the commonly referenced objects are referenced via keys, rather than directly.

An implementation referencing the common objects via keys has a disadvantage in that an additional lookup is required to access an item from the first shared cache (the second lookup is to access the referenced object), which is not required when simply traversing an object reference, as with the implementation described above. Additionally, the fact that data can be evicted from the cache may result in a need to recreate data on the fly.

In one embodiment, an agent is used to determine when references resulting in the above-described error conditions are made. Such references may be considered to be illegal references, and required to be eliminated. Illegal reference detection can be performed by an agent to debug a system. The agent can either check one or more regions of shared memory at a certain point in time, or continuously on every cache put operation. The resource consumption of the agent can make running the agent very computationally expensive, which may relegate the agent to use in debugging instead of in a production environment.

Figure 2:
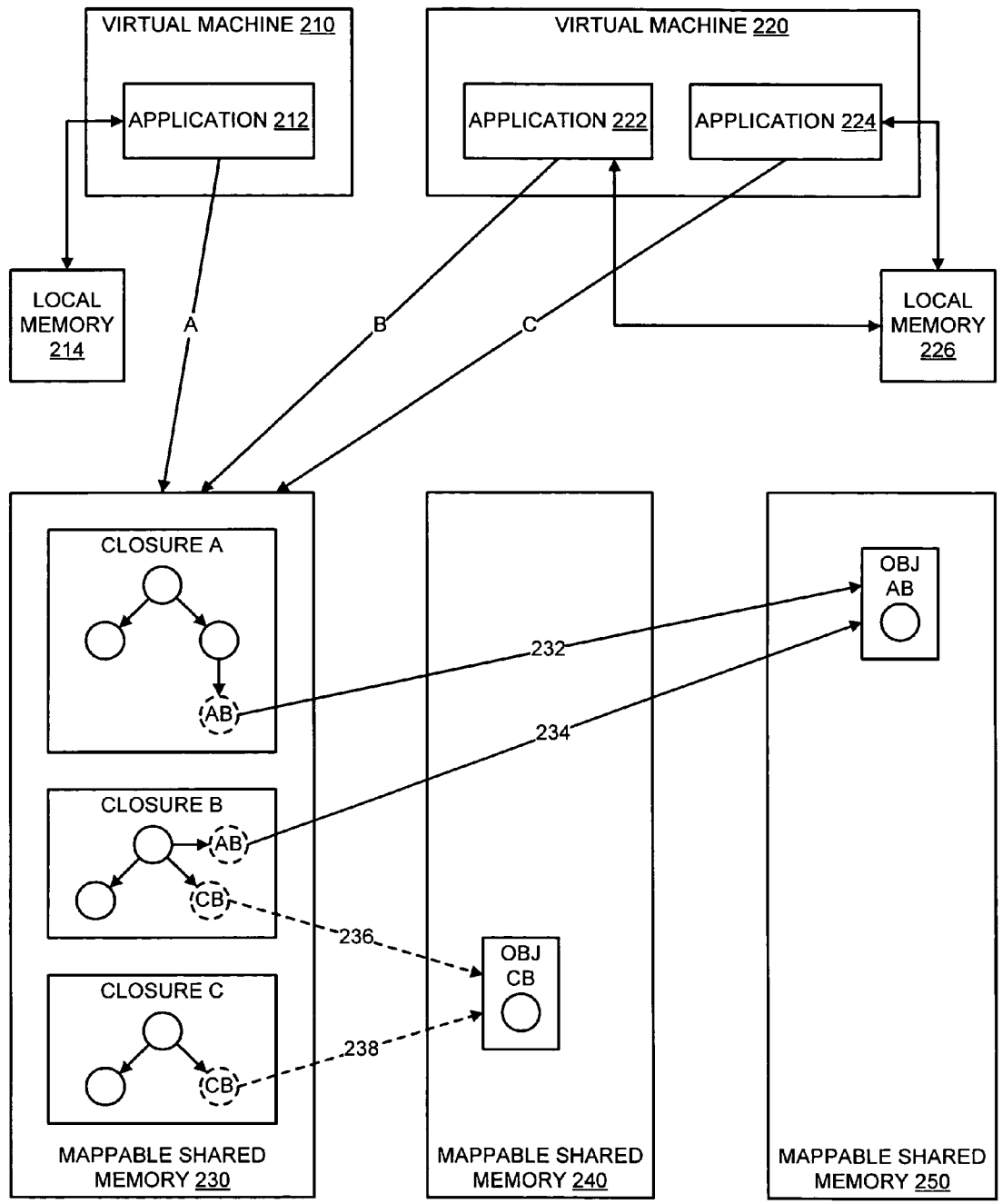
FIG. 2 is a block diagram of an embodiment of a multiple mappable shared memories.

FIG. 2 is a block diagram of an embodiment of multiple mappable shared memories. Virtual machines 210 and 220 represent virtual parts of a system, such as an enterprise system. Virtual machine 210 includes application 212, which has access to local memory 214. Application 212 provides an environment in virtual machine 210 in which to perform one or more functions. Application 212 may access one or more objects in shared memory, for example, in one embodiment, application 212 accesses closure A of mappable shared memory 230.

Virtual machine 220 includes applications 222 and 224, which have access to local memory 226. Application 222 accesses closure B, and application 224 accesses closure C. Virtual machines 210-220 may have more applications than what are shown in FIG. 2. In one embodiment, local memory is local to a virtual machine. Thus, local memory 214 may be local to virtual machine 210 and any applications or routines executing within virtual machine 210. Likewise, local memory 226 may be local to virtual machine 220 and applications 222 and 224, or other applications or routines within virtual machine 220. Local memories 214 and 226 may be distinguished from shared memory, which may be accessed across virtual machines. Local memories 214 and 226 can be memory segments or allocated memory addresses that are only accessible to their respective VMs. Shared memory is accessible from all VMs. A VM can access an object inside a shared closure either by a map or a copy operation. The map operation provides a direct object reference into the shared closure that is located in the shared memory segment. The map operation has an advantage over the copy operation, because the objects need not be copied. However, it also has a disadvantage in that the objects are read only and cannot be modified. The copy operation copies the contents of the shared closure into the local memory of the VM, where the objects can then be modified locally. The disadvantage is the performance cost of the copy operation.

Shared memory may be separated into one or more logical separations, as depicted with mappable shared memories 230, 240, and 250. In one embodiment, the separation of the memories includes management of the different shared memories by distinct memory management entities. In another embodiment, the separation of the memories may include the different treatment of particular items by a memory management entity. For example, shared memory 230 may have a separate manager than shared memory 240.

In one embodiment, shared memory 230 includes closure A and closure B, which reference object AB. Object AB is a shared or commonly referenced object because multiple shared closures reference it. Rather than storing object AB within shared memory 230, as traditionally done, an application may store object AB in shared memory 250, which is separate from shared memory 230 where closure A and closure B reside. In one embodiment, the reference to object AB may be via direct references 232 and 234. The direct references may include a memory address or memory location of the physical or virtual memory in which object AB is stored. Thus, object AB may be stored separately from the shared closures A and B that reference the object, and be accessed without an additional lookup penalty.

In one embodiment, shared memory 230 includes closure B and closure C, which reference object CB. As with object AB, object CB is stored in a memory that is managed separately from the referencing closures. Object CB is referenced via indirect references 236 and 238, which may be, for example, a key used by a memory manager to reference object CB.

In one embodiment, instead of a single shared memory that includes shared closures and referenced objects, a system may include shared memory separated into more than two shared memories. Thus, the shared memory can be managed as two or more memories. Specifically referring to FIG. 2, the system could have all shared memories 230, 240, and 250 in the system. Through the use of multiple shared memories, the system could have one shared memory that accesses certain objects through direct reference, and another shared memory that accesses objects through indirect references.

The selection of objects to place in a separate shared memory could occur through a variety of processes. Factors to consider may include object usage, number of objects, object size, number of reads, etc. An agent within the memory manager indicates when reference is made to stored objects. The agent indication can cause a developer to store the objects in separate caches, as appropriate. Thus, if an object is determined to be referenced by multiple shared closures, the object may be stored in a separate shared memory.

Figure 3:
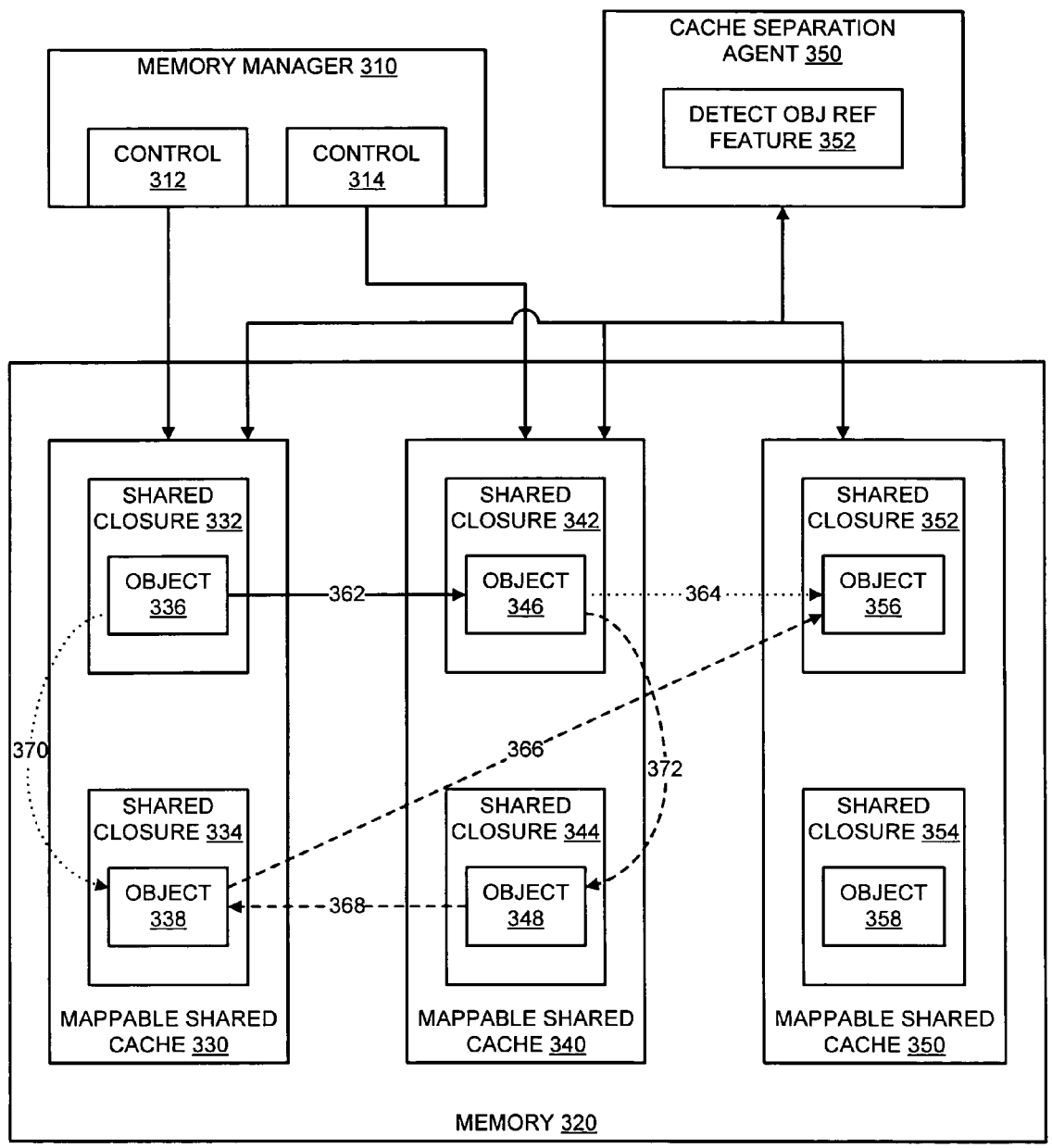
FIG. 3 is a block diagram of an embodiment of a memory manager that manages multiple shared caches and a cache separation agent.

FIG. 3 is a block diagram of an embodiment of memory management that manages multiple shared caches and a cache separation agent. Memory management 310 manages memory 320. Memory 320 may include any type of volatile storage, for example, random access memory (RAM), dynamic RAM (DRAM), synchronous DRAM (SDRAM) or other type of DRAM, static RAM (SRAM), dual data rate RAM (DDR RAM), etc. Memory 320 may be separated in terms of management. Separate management can include the treatment of certain portions of memory 320 as separate logical structures, or separate virtual entities. For example, certain address spaces can be treated as a memory, with rules defining the behavior of the memory, how eviction or other management functions are performed, etc. Separate management can also include the treatment of items being treated separately. Thus, certain items may be flagged or identified in a table or through another mechanism as being different than other items, i.e., rules may be differently applied.

The rules or differences in administration are represented by control 312 and control 314. Control 312 and control 314 could be the same entity that applies rules separately to "separate" memory. Alternatively, control 312 and control 314 may be separate entities (e.g., individual CMLs with different parameters). In one embodiment, as a logical memory separation is established, a control is generated to manage the memory, and/or different rules for management are generated/implemented for the logical memory separation.

Mappable shared cache 330 includes shared closures 332 and 334, which have objects 336 and 338, respectively. Mappable shared cache 340 includes shared closures 342 and 344, which have objects 346 and 348, respectively. Mappable shared cache 350 includes shared closures 352 and 354, which have objects 356 and 358, respectively. The number of shared closures and objects is merely for purposes of example, and should not be understood as typical or limiting. Mappable shared cache 330, mappable shared cache 340, and mappable shared cache 350 are separate memory entities from the perspective of applying memory management operations. Thus, different applications of management operations are associated with separate memory portions. As an example configuration for the description given below, it is configured that objects from mappable shared cache 330 may reference objects from mappable shared cache 340 via direct reference. Additionally, objects from mappable shared cache 340 may reference objects from mappable shared cache 350 via indirect reference. All other references between objects (direct and indirect) in different shared closures (whether in the same mappable shared cache or another) are disallowed. Object 336 references object 346, which is a direct reference. In short, a direct reference is a reference that can be resolved by access to the shared closure without the cost of additional lookups. Object 346 references object 356, which is an indirect reference (as indicated by the dotted line). An indirect reference involves at least one additional lookup to access the referenced object. Both references are allowed, as shown by the solid lines. Objects can reference objects that are part of separate caches without causing the problems described above.

There are also shown several types of disallowed references. One or more disallowed references may be detectable and could be reported as disallowed. In general, direct references can be detected automatically, but indirect references cannot as they may contain application semantics. Reference 370 from object 336 to object 338 is disallowed, but not detectable because it is an indirect reference. Direct reference 372 from object 346 to object 348, direct reference 366 from object 338 to object 356, and direct reference 368 from object 348 to object 338 are disallowed references, as indicated by the dashed lines. These references are also detectable and can be reported to indicate how objects should be separated and stored in different caches.

Cache separation agent 350 provides information to determine how to separate the objects into different caches. The agent is local to a single VM. Cache separation agent 350 includes detect object reference feature 352, which provides the ability to detect that an object references another object that is shared. Detected references may be either allowed or disallowed. Some or all disallowed references are reported by the agent to indicate potential cache problems discussed above. Detect object reference feature 352 determines the location of referenced objects. The location of the referenced object may determine whether the reference generated to the object creates a reference that would result in one or more of the situations discussed in FIG. 1. References may be general, or they may be as part of a shared closure. The agent is loaded with the configuration such as the example configuration provided above to indicate allowed references and disallowed references. References may be allowed to objects within a certain memory space or region, and may be disallowed in a different memory space. In one embodiment, allowed memory regions are indicated. In another embodiment, disallowed memory regions are indicated.

Agents or modules may include hardware, software, and/or a combination of these. In a case where agent 350 or its constituent components include software, the software data, instructions, and/or configuration may be provided via an article of manufacture by a machine/electronic device/hardware. An article of manufacture may include a machine accessible/readable medium having content to provide instructions, data, etc. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 4:
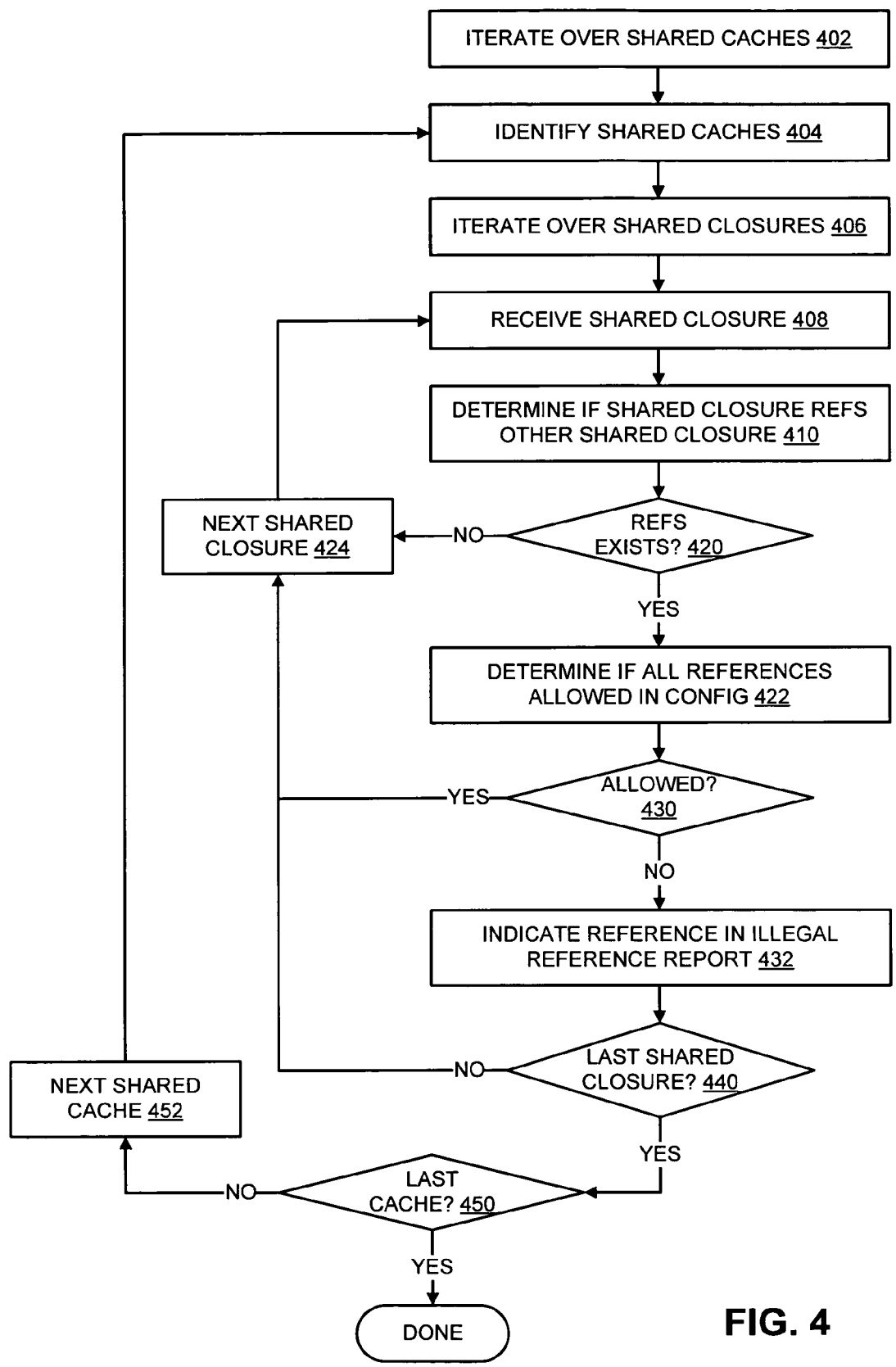
FIG. 4 is a flow diagram of an embodiment of detecting references to separate to different caches.

FIG. 4 is a flow diagram of an embodiment of detecting references to separate to different caches. A cache separation agent determines which references in a system are potentially problematic references that should be corrected. The cache separation agent iterates over all shared caches present in a system to detect disallowed references, 402. The cache separation agent identifies a cache to check, 404. The cache separation agent iterates through all shared closures within the identified cache, 406. The shared closure is accessed, or received, 408. In a cache put operation, the shared closure is received, while the shared closure is accessed for other times that the process may be executed.

The cache separation agent determines for the selected cache closure whether it includes any references to other shared closures, 410. If there are no references to other shared closures, 420, the next shared closure of the cache is selected, 424, and the determination repeats for the next shared closure. If there is a reference to another shared closure, 420, the cache separation agent determines whether the references are to allowed regions for the given configuration of the system, 422. If all references are allowed, 430, the next shared closure is selected. If one or more of the references is not allowed, 430, the reference is indicated in an illegal reference report generated by the cache separation agent, 432.

The shared closure is searched for all references. If the last shared closure for the cache has not been searched, 440, the next shared closure is selected and searched. If the last shared closure has been searched, the cache separation agent will search the next shared cache. If there is another shared cache to search, 450, the next shared cache is selected, 452, and the process repeats. If there are no more shared caches to search, 450, the process is finished, and the report is presented to a developer.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An article of manufacture comprising a machine accessible medium having content stored thereon to provide instructions to cause a machine to perform operations, including:
   accessing a shared closure of a mappable shared cache, the shared closure having multiple data objects;
   detecting at least one data object that is referenced by a data object of a disallowed memory location;
   indicating the detected data object as a shared data object to cause the data object to be stored in a shared data object cache that stores shared data objects, the shared data object cache to be managed separately from a cache that stores the data object of the different shared closure that references the shared data object.

2. The article of manufacture of claim 1, wherein the content to provide instructions for detecting that the shared data object is referenced from the data object from the disallowed memory location comprises content to provide instructions for:
   determining that the data object from the disallowed memory location resides in a location disallowed in a shared memory configuration of a shared memory in which the shared data object resides, the disallowed location being in a shared memory different from the shared memory in which the shared data object resides.

3. The article of manufacture of claim 1, further comprising content to provide instructions for:
   configuring a cache management library (CML) to separately manage the shared data object cache.

4. A cache separation agent comprising:
   a shared closure identifier module to identify a shared closure to check for disallowed references to data objects of the shared closure; and
   an object reference detection module to detect a reference to an object of the identified shared closure from a referencing object, determine whether the reference is made from within a disallowed memory region, and indicate the referenced object as shared to cause the referenced object to be stored in a cache separate from a cache that caches the referencing object, in response to determining that the reference is made from within a disallowed memory region.

5. The cache separation agent of claim 4, wherein the object reference detection module is to determine whether the reference is made from within a memory region allowed in a configuration for the shared closure.

6. The cache separation agent of claim 4, wherein the object reference detection module is to detect the reference in a debugging routine.

7. The cache separation agent of claim 4, wherein the object reference detection module is to generate a disallowed reference report to indicate the reference is made from within the disallowed memory region.

8. A method for managing shared objects, comprising:
   accessing a shared closure of a mappable shared cache, the shared closure having multiple data objects;
   detecting at least one data object that is referenced by a data object of a disallowed memory location;
   indicating the detected data object as a shared data object to cause the data object to be stored in a shared data object cache that stores shared data objects, the shared data object cache to be managed separately from a cache that stores the data object of the different shared closure that references the shared data object.

9. The method of claim 8, wherein detecting the shared data object referenced by the data object comprises:
   detecting the data object references the shared data object with an indirect reference to the shared data object.

10. The method of claim 8, wherein detecting the shared data object referenced by the data object comprises:
    detecting the data object references the shared data object with a direct reference to the shared data object.

11. The method of claim 10, further comprising:
    preventing modification of the shared data object.

12. The method of claim 8, wherein the data object references the shared data object with an indirect reference, and further comprising:
    storing an additional shared data object in a separate data object cache to be managed separately from the shared data object cache and the cache that stores the data object of the different shared closure that references the data object, where the shared closure has an additional data object having a direct memory location reference to the additional shared data object.

* * * * *